ced Apr. 27, 1943

UNITED STATES PATENT OFFICE 2,317,387

DISPERSIBLE DISAZO DYE

Donovan E. Kvalnes, Penns Grove, N. J., and Sanford B. Smith, Hockessin, and Cheves Walling, Wilmington, Del., assignors to E. I. du Pont de Nemours & Company, Wilmington, Del., a corporation of Delaware No Drawing. Application June 19, 1940, Serial No. 341,304

7 Claims. (Cl. 260—160)

This invention relates to new disazo dyes which are suitable and useful in dispersed form for dyeing various fibers such as cellulose acetate, and especially to such disazo dyes in which the end component is a phenol or a derivative thereof which is devoid of water solubilizing groups and the diazo component is a primary arylamine which contains a sulfon-amide group, and to processes of making the dyes.

Various insoluble azo dyes have heretofore been provided which can be used in aqueous dispersions to make dyeings on cellulose acetate fibers. However, such dyes which produced pleasing shades of yellow to red did not have a desirable combination of other needed properties.

It is among the objects of the invention to provide new disazo dyes which can be used in aqueous dispersions to dye cellulose acetate and similar dyeable fibers in shades of yellow to red. Another object of the invention is to provide such dyes which have good affinity for such fibers, operate satisfactorily in the dye house and which produce dyeings having good fastness properties commonly required in such dyed products, and especially excellent fastness to light. Other objects of the invention will be apparent from the following description.

The objects of the invention are attained in general by providing an aryl sulfon-amide of the benzene or naphthalene series which has a diazotizable primary amine group. This amino-substituted aryl sulfon-amide is diazotized and coupled with an azo dye coupling component of the group consisting of primary arylamines which are devoid of water solubilizing groups, such as carboxy and sulfonic acid, the amino group being capable of diazotization after the coupling is made. This monazo compound is diazotized and coupled with any azo dye coupling component of the hydroxy benzene series which is devoid of water solubilizing groups, such as carboxy and sulfonic acid groups. The dyes are represented by the general formula

A—N=N—M—N=N—E

Dyeings are made by making an aqueous dispersion of the disazo compound in water, usually with the aid of a dispersing agent, such as soap. These dispersions may be made in the manner similar to known methods of making dispersions of other water insoluble acetate rayon dyes. The dyebath is desirably operated at elevated temperature such as 70° to 80° C. or even at a higher temperature, and the material to be dyed is entered into the dyebath until it is dyed.

The invention will be more fully set forth in the following more detailed description which includes examples that are given as illustrative embodiments of the invention and not as limitations thereof. Parts are expressed in parts by weight unless otherwise noted.

Example I

Sulfanilamide (17.2 parts) was dissolved in 500 parts of water at 10° C. with the aid of 9 parts of hydrochloric acid (as a 10 N solution). Then 6.9 parts of sodium nitrite as a 5 N solution were added. After one-half hour, the clear solution was cooled to 0° C. by the addition of ice, and a solution containing 15.3 parts of 2,5-dimethoxyaniline in 200 cc. water and 3.6 parts hydrochloric acid as a 10 N solution was added. Solid sodium acetate was added in small portions until the mixture was no longer acid to Congo red paper. The mixture was stirred one-half hour longer, and filtered. The precipitate was placed in 500 parts of water at 15° C. The mixture was acidified by adding 9 parts of hydrochloric acid as a 10 N solution, and then 6.9 parts of sodium nitrite were added as a 5 N solution. After one hour, the suspension was cooled to 0° C. by addition of ice, and 10 parts of phenol in 20 parts water were added. Enough 10 N caustic was then added slowly to make the suspension alkaline to Brilliant Yellow paper. After 10 minutes, the suspension was filtered and the filter cake was dried. The product was a brownish orange powder which is represented by the formula

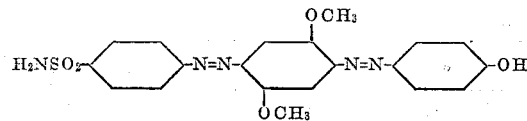

One part of the brownish orange powder which had been milled with one part of castile soap was stirred into 10 parts of water which had been heated to 80° C. A dyebath was made by stirring the aqueous mixture into 3000 parts of water at 75° C. A piece of acetate rayon amounting to 100 parts of the fiber was introduced into the dyebath. The temperature of the bath was slowly raised to 85° C. over a period of 15 minutes and held at this temperature during the dyeing. The piece was turned in the bath from time to time and the dyeing was completed in about forty-five minutes. When the dyeing was completed, the piece was removed from the bath, rinsed and dried. The dyeing was a reddish orange shade and had very good fastness to light as well as good fastness properties to sublimation and good discharge properties. The dyestuff had good affinity for cellulose acetate fiber.

By using 10.7 parts of meta-toluidine instead of 15.3 parts of 2,5-dimethoxy-aniline in the foregoing procedure, an orange powder which was insoluble in water but soluble in many organic solvents was produced. A dispersion of this product in water dyed cellulose acetate fiber a pleasing golden orange. The dyeing had excellent fastness to light, washing, and sublimation, and had good discharge and exhaust properties.

*Example II*

Sulfanilamide (17.2 parts) was diazotized as described in Example I. The solution was run slowly into an iced solution of 19 parts of 1(para-amino-phenyl)-3-methyl-5-pyrazolone in 500 parts of water containing 25 parts of soda ash. After one-half hour, the suspension was filtered and the precipitate diazotized and coupled with phenol as described in Example I. The product was a brownish yellow powder which dyed acetate silk from an aqueous dispersion a pleasing red-shade yellow having excellent fastness to light, good fastness to washing and sublimation and good discharge properties. The dyestuff had good affinity for cellulose acetate in aqueous dispersion. The product is represented by the formula

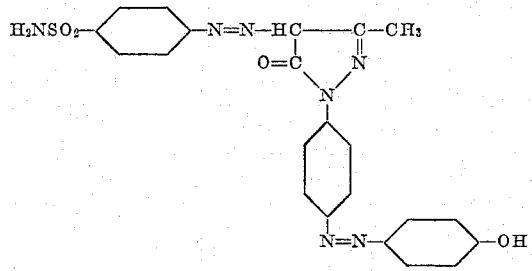

*Example III*

By using 21.6 parts of 4-amino-benzene-sulfonyl ethanolamine in the procedure of Example I instead of 15.3 parts of the sulfanilamide recited therein, the product was another brownish orange powder which, when dispersed in water had good affinity for cellulose acetate and dyed cellulose acetate a red-orange having excellent light fastness, good fastness to sublimation and good discharge properties.

The product is represented by the formula

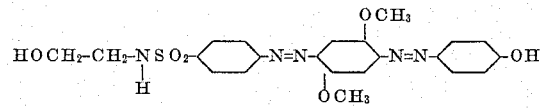

*Example IV*

By using 20.2 parts of 4-methoxy-3-amino-benzene sulfonamide in the procedure of Example II instead of the sulfanilamide recited therein, another brownish-yellow powder was produced which dyed cellulose acetate from an aqueous dispersion a yellow shade having excellent light fastness, good fastness to washing and sublimation and good discharge properties. In aqueous dispersion the affinity for cellulose acetate was good.

The compound is represented by the formula

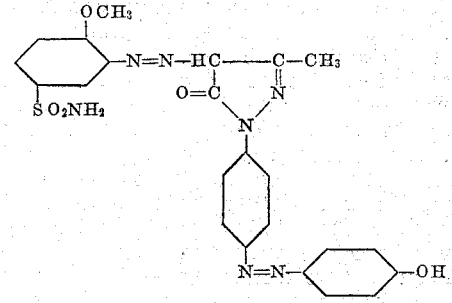

The dyestuffs made by coupling the components shown in the following examples were prepared by similar methods to those described in the foregoing examples. The dyeings were made in similar manner and the dyeings had similar properties except where variations are noted.

| Example | Diazo component | M component | E component | Color of dyeing on acetate silk |
|---|---|---|---|---|
| 5 | 4-amino-benzene sulfonamide | Para-xylidine | Phenol | Orange. |
| 6 | do | Cresidine | do | Do. |
| 7 | do | Meta-anisidine | do | Do. |
| 8 | do | Formyl-meta-phenylene diamine | do | Red orange. |
| 9 | do | 4-acetyl-amino-2-amino anisole | do | Do. |
| 10 | do | 4-acetyl-amino-3-amino anisole | do | Do. |
| 11 | do | Meta-toluidine | do | Orange. |
| 12 | do | Aniline | do | Do. |
| 13 | do | 1 (meta-amino-phenyl)-3-methyl-5-pyrazolone | do | Yellow. |
| 14 | do | Ortho-anisidine | do | Orange. |
| 15 | do | Meta-amino-benzyl alcohol | do | Do. |
| 16 | do | 2-amino-3-methoxy-benzyl alcohol | do | Do. |
| 17 | do | Ortho-anisidine | Para-cresol | Do. |
| 18 | do | Meta-toluidine | Para-cresol sulfonamide | Red orange. |
| 19 | do | 2, 5-dimethoxy-aniline | do | Do. |
| 20 | do | do | Meta-acetylamino-phenol | Brown orange. |
| 21 | do | do | Ortho-dimethyl-amino-phenol | Do. |
| 22 | do | Meta-toluidine | do | Do. |
| 23 | do | do | Meta-acetyl-amino-phenol | Do. |
| 24 | 4-amino-benzene-sulfonyl-methyl-amine | do | Phenol | Golden orange. |
| 25 | do | 2, 5-dimethoxy-aniline | do | Red orange. |
| 26 | do | Alpha-naphthylamine | do | Orange. |
| 27 | 4-amino-benzene-sulfonyl-ethanol-amine | Meta-toluidine | do | Golden orange. |
| 28 | do | Alpha-naphthylamine | do | Orange. |
| 29 | do | 2, 3-dimethoxy-aniline | do | Red orange. |
| 30 | do | 1 (meta-amino-phenyl)-3-methyl-pyrazolone | do | Yellow. |
| 31 | do | 1 (para-amino-phenyl)-3-methyl-5-pyrazolone | do | Do. |

| Example | Diazo-component | M component | E component | Color of dyeing on acetate silk |
|---|---|---|---|---|
| 32 | 3-chloro-4-amino-benzene-sulfonamide | Meta-toluidine | Phenol | Golden orange. |
| 33 | ___do___ | 1 (meta-amino-phenyl)-3-methyl-5-pyrazolone. | ___do___ | Yellow. |
| 34 | ___do___ | 2, 5-dimethoxy-aniline | ___do___ | Red orange. |
| 35 | ___do___ | Alpha-naphthylamine | ___do___ | Orange. |
| 36 | 4-chloro-3-amino-benzene-sulfonamide. | Meta-toluidine | ___do___ | Do. |
| 37 | ___do___ | 2, 5-dimethoxy-aniline | ___do___ | Do. |
| 38 | 4-methoxy-3-amino-benzene sulfonamide. | Meta-toluidine | ___do___ | Golden orange. |
| 39 | ___do___ | 2, 5-dimethoxy-aniline | ___do___ | Orange. |
| 40 | ___do___ | 1 (para-amino-phenyl)-3-methyl-5-pyrazolone. | ___do___ | Yellow. |
| 41 | ___do___ | 1-(meta-amino-phenyl)-3-methyl-5-pyrazolone. | ___do___ | Do. |
| 42 | ___do___ | Alpha-naphthylamine | ___do___ | Orange. |
| 43 | 1, 4-naphthylamine-sulfonamide | 1-(meta-amino-phenyl)-3-methyl-5-pyrazolone. | ___do___ | Yellow. |
| 44 | ___do___ | 2, 5-dimethoxy-aniline | ___do___ | Scarlet. |

Any of the described types of aryl-sulfonamides of the amino benzene and amino naphthalene series can be used as the diazo component to produce the dyestuffs having the general properties of the dyes heretofore described. Other illustrations are 4-amino-3-methoxy-benzene-sulfonamide, 4-amino-3-bromo-benzene-sulfonamide, 4-amino-3-trifluoromethyl-benzene-sulfonamide, 4-amino-3-ethyl-benzene-sulfonamide, 4-amino-2-ethoxy-benzene-sulfonamide, 4-amino-2-methyl-benzene-sulfonamide, 3-amino-4-trifluoromethyl-benzene-sulfonamide, 5-amino-2-methyl-benzene-sulfonamide, 5-amino-2-bromo-benzene-sulfonamide, 4-amino-3-nitro-benzene-sulfonamide, 4-amino-3-methyl-benzene-sulfonyl-ethanolamide, 4-amino-3-chloro-benzene-sulfonyl-ethanolamide, 3-amino-4-methoxy-benzene-sulfonyl-ethanolamide, 4-amino-3-chloro-benzene-sulfonyl-trimethylol-methylamide, 3-amino-4-methoxy-benzene-sulfonyl-trimethylol-methylamide, 1-amino-naphthalene-6-sulfonamide and 1-amino-naphthalene-7-sulfonamide.

The second or M component may be any azo dye coupling component of the kind hereinbefore described which is devoid of water solubilizing groups. Other illustrations are ortho- and meta-phenetidine, o-toluidine, 3-amino acetanilide, 2-amino-4-acetylamino toluene and the 1-3(or 4)-aminophenyl-3-carbethoxy (or carbmethoxy)-5-pyrazolones.

As further illustrations of the coupling components of the hydroxy benzene series which are devoid of carboxy and sulfonic acid groups and which can be used as last components to make dyestuffs similar in properties to those specifically disclosed, are mentioned ortho-cresol, meta-cresol, para-xylenol, 1,3,5-xylenol, resorcin, resorcin-monomethyl ether, hydroquinone-monoethyl ether, meta-aminophenol, methyl salicylate and guaiacol.

The modifications of the invention in which the second coupling component is phenol are preferred. In general this modification is better from the standpoint of both superior light fastness and good dyeing properties.

The compounds of the invention are especially useful in that they provide dyeings on cellulose acetate fibers having light fastness which is superior to other acetate dyes of similar shade. However, they may be used to dye other kinds of dyeable materials, such as other cellulose esters and ethers, polymerized polyamide resinous materials, other polymerized products and similar dyeable materials, either when the materials are in fibrous or in other forms. In hydrous dispersions, the dyestuffs have good affinity for cellulose acetate and similar dyeable fibers but they can be used successfully for appropriate purposes in other forms than hydrous dispersions, such as solutions in some of the organic solvents.

From the foregoing disclosure it will be recognized that the invention is susceptible of modification without departing from the spirit and scope thereof and it is to be understood that the invention is not restricted to the specific illustrations thereof herein set forth.

We claim:

1. A dispersible disazo compound represented by the formula A—N=N—M—N=N—E wherein A is the residue after diazotization of an aryl sulfon-amide of the benzene and naphthalene series containing a diazotizable primary amine group, the amido nitrogen of the sulfon-amide group having at least one hydrogen; M represents the residue after coupling and diazotization of an azo dye coupling component of the group consisting of primary arylamines which are devoid of water solubilizing groups and is from the group consisting of the 1-(amino-phenyl)-3-methyl-5-pyrazolones and the primary arylamines of the benzene and naphthalene series; and E is the radical of an azo dye coupling component of the hydroxy benzene series which is devoid of water solubilizing groups.

2. A dispersible disazo compound represented by the formula

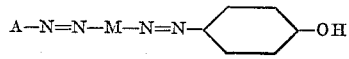

wherein A is the radical after diazotization of an aryl sulfon-amide of the benzene and naphthalene series containing a diazotizable primary amine, the amido nitrogen of the sulfon-amide group having at least one hydrogen; and M represents the residue after coupling and diazotization of an azo dye coupling component of the group consisting of primary arylamines which are devoid of water solubilizing groups and is from the group consisting of the 1-(amino-phenyl)-3-methyl-5-pyrazolones and the primary arylamines of the benzene and naphthalene series.

3. A dispersible disazo compound represented by the formula

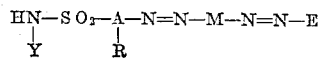

wherein Y is one of a group consisting of hydrogen, alkyl having 1 to 4 carbons, hydroxyethyl, dimethylolmethyl and trimethylolmethyl; A is a radical of the group consisting of benzene and naphthalene; R is one of a group consisting of hydrogen, alkyl having 1 to 4 carbons, the corresponding alkoxy groups, chlorine, bromine, nitro and trifluoromethyl; M represents the residue after coupling and diazotization of an azo dye coupling component which is devoid of water solubilizing groups and is from the group consisting of the 1-(amino-phenyl)-3-methyl-5-pyrazolones and the primary arylamines of the benzene and naphthalene series; and E is the radical of an azo dye coupling component of the hydroxy benzene series which is devoid of water solubilizing groups.

4. The compound represented by the formula

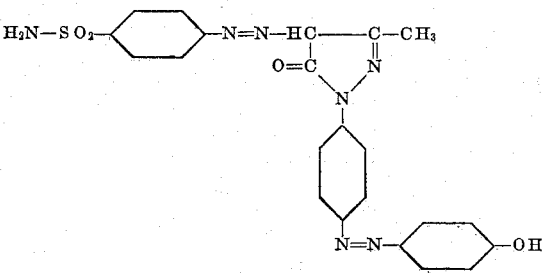

5. The compound represented by the formula

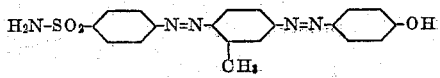

6. The compound represented by the formula

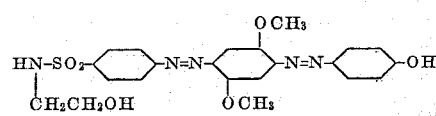

7. The process which comprises diazotizing an amino-substituted aryl sulfon-amide of the benzene and naphthalene series, the amido nitrogen of the sulfon-amide group having at least one hydrogen; coupling with an azo dye coupling component of the group consisting of primary arylamines which are devoid of water solubilizing groups and is from the group consisting of the 1-(amino-phenyl)-3-methyl-5-pyrazolones and the primary arylamines of the benzene and naphthalene series; diazotizing the resulting monazo compound and coupling with an azo coupling component of the hydroxy benzene series which is devoid of water solubilizing groups.

DONOVAN E. KVALNES.
SANFORD B. SMITH.
CHEVES WALLING.